Aug. 30, 1966     G. RUELLE ETAL     3,270,229
COOLING ARRANGEMENTS FOR ELECTRIC MACHINES
Filed Dec. 12, 1963
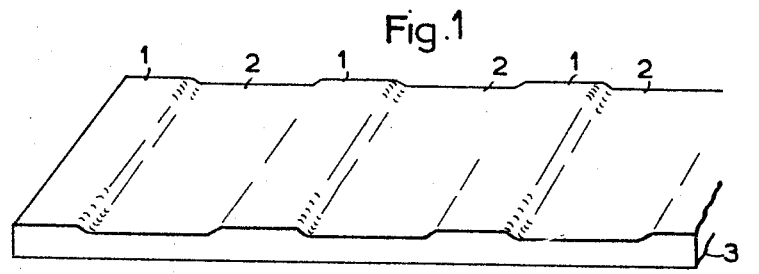
Fig. 1
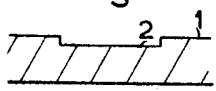   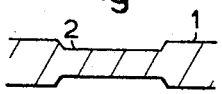   
Fig. 2     Fig. 3     Fig. 4
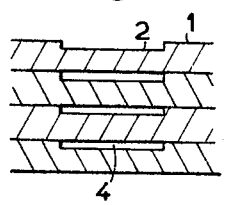   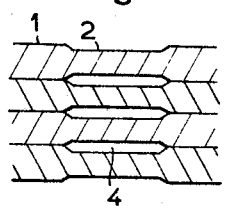   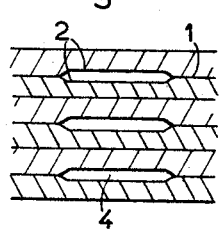
Fig. 5     Fig. 6     Fig. 7
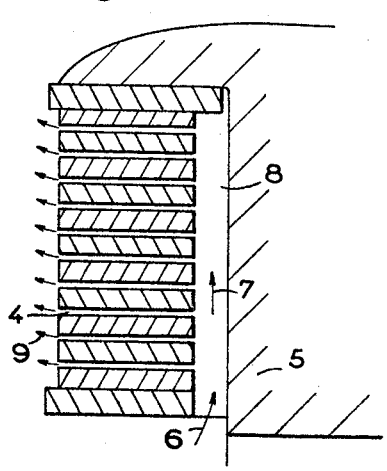   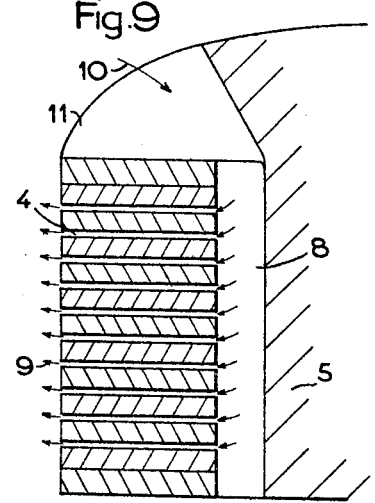
Fig. 8     Fig. 9
INVENTORS
GILBERT RUELLE
MARCEL PETER
By Holcomb, Wetherill & Brisbin
ATTORNEYS United States Patent Office 3,270,229
Patented August 30, 1966

3,270,229
COOLING ARRANGEMENTS FOR ELECTRIC MACHINES
Gilbert Ruelle and Marcel Peter, Belfort, France, assignors to Societe Generale de Constructions Electriques et Mecaniques (Alsthom), Paris, France, a French body corporate
Filed Dec. 12, 1963, Ser. No. 330,183
Claims priority, application France, Dec. 29, 1962, 2,380, Patent, 1,358,411
14 Claims. (Cl. 310—180)

Synchronous machines having rotating field magnets, particularly high-power A.C. generators driven by hydraulic turbines, are usually equipped with a flywheel-shaped rotor, onto the rim of which are fixed the inductive pole faces.

It is already known to cool such pole faces and their excitation coils, which are the sources of electrical losses, by circulating air axially or radially about the pole faces and their field windings as a whole, or between the various pole faces and their field windings.

The field windings of high-power synchronous machines are generally in the form of a single layer of turns of a rectangular-section conductor wound lengthwise.

The present invention relates to cooling arrangements for such field magnets of salient pole synchronous electric machines which enable the field windings and the pole faces to be rationally ventilated without incurring severe penalties in respect of construction cost and with a saving in the quantity of material used.

According to the present invention, the conductor which is to be wound lengthwise to form the field windings comprises a splined conductor, i.e., it embodies, along its path, consecutively raised and recessed portions on at least one of the two faces that will be adjacent each other subsequent to winding, whereby to provide transverse vents in the windings.

The raised conductor portions ensure mechanical cohesion between the turns as a whole which, in operation, are subjected to powerful centrifugal forces tending to move them closer to one another, while the recessed conductor portions provide transverse gaps or vents for circulation of the cooling gas through the field windings.

In accordance with a further feature of the invention, the cooling gas is introduced between the pole face and the field winding and escapes through the vents formed between turns by the recessed portions of the splined conductors.

Calculations show that the flow through the vents formed in accordance with this invention is generally laminar in character. As a result, the peculiar thermal properties of this type of flow (heat transfer coefficient independent of the velocity of the fluid and inversely proportional to the depth of the vent) lead to the adoption of very narrow vents (from 1 to 3 millimetres, for example), which are entirely compatible with the vital requirements of minimum increase in the electrical resistance of the field magnet and satisfactory rolling of the splined conductor, and also with the average copper thicknesses customarily used.

The description which follows with reference to the accompanying non-limitative exemplary drawings will give a clear understanding of how the invention can be carried into effect. In the accompanying drawings:

FIGURE 1 is a partial perspective view and FIGURES 2 to 7 are partial longitudinal sections of different embodiments of field winding according to this invention, and, FIGURES 8 and 9 are partial transverse sections of field windings assembled to rotor salient pole pieces, showing examples of cooling arrangements according to the invention.

Referring to the drawings, FIGURE 1 shows a splined conductor, i.e., a conductor having consecutively transverse raised portions 1" and recessed portions 2 extending along its length on one of its faces, the other face 3 being flat.

FIGURES 2 and 4 illustrate splined conductors having differently shaped recesses 2 in one face thereof, whilst in the example shown in FIGURE 3, both faces of the conductor are splined. FIGURES 5 to 7 show how, by superimposing the splined conductors of FIGURES 2 to 4 respectively, it is possible to obtain transverse vents 4. The coincidence of the recesses 2 between adjacent field winding turns is achieved by reason of the fact that the turns are of identical size and that the pitch of the consecutive recesses is selected according to that size. In the specific example of FIGURE 7, two conductors have been arranged in parallel, i.e., back to back in pairs, and produce therebetween vents 4 between the two conductors of each pair, but not between adjacent pairs.

More generally, a plurality of conductors can be disposed in parallel and be mutually isolated or not. A great number of alternative embodiments can also be envisaged by modifying the absolute and relative lengths and depths of the hollows or recesses 2 in, and projections or raised portions 1 on, the surface of the conductor.

FIGURE 8 shows a field winding formed by means of a splined conductor and mounted on a pole face 5. When the machine is in operation, cooling air is introduced through the base of the pole face, in the direction of the arrow 6; it follows the arrows 7 and flows through the gap 8 between the coil and the pole face, whence it emerges, in the direction of arrows 9, through the vents 4 provided in the coil, as previously disclosed.

More specifically, the air can be conveyed to the base of the pole face 5 by utilizing a rotor rim of the type described in the specification of, and in the drawings accompanying copending United States application Serial No. 328,928, filed by Gilbert Ruelle and Marcel Peter, and entitled, "Rotor Rim for Electric Machines." In addition, a system of deflectors may be provided to cause part of the air issuing radially from the rotor rim to hug the outer surface of the coil, thereby generating a suction effect on the air following the arrows 6, 7 and 9.

Like FIGURE 8, FIGURE 9 shows a field winding mounted on a pole face 5. In this case, however, the cooling air is introduced in the direction of the arrow 10 into that portion of the field pole which is adjacent the air gap of the machine, using for the purpose indents 11 provided at intervals in the horns of the pole face 5. Use is thus made of the dynamic pressure engendered thereat by the rotation of the field magnet. The indents 11 can if necessary be inclined whereby to make best use of the available dynamic pressure.

It goes without saying that the cooling provisions described with reference to the accompanying drawings could be combined if desired, and that a fluid other than air could be utilized for the cooling.

We claim:

1. Cooling arrangement for the field magnets of a salient pole synchronous electric machines, the coils of which are formed by winding a conductor lengthwise, wherein said conductor is a splined conductor having, along substantially its entire length, consecutive raised portions and recessed portions on at least one of the faces which are to be adjacent subsequent to winding, whereby to provide transverse vents in said coils distributed over substantially the entire length of said coils.

2. Cooling arrangement according to claim 1, wherein the cooling gas is introduced between the pole faces and the field windings and emerges through said transverse vents.

3. Cooling arrangement according to claim 2, wherein the cooling gas is introduced between the pole faces and the field windings through the base of said pole faces.

4. Cooling arrangement according to claim 2, wherein the cooling gas is introduced between the pole faces and the field windings through indents provided in the horns of the pole faces.

5. In a synchronous electric machine, including a rotor provided with a plurality of poles, each having generally longitudinally extending side faces; a rotor winding associated with each pole and comprising a plurality of turns of a rectangular cross-section, splined conductor, disposed lengthwise and stacked one upon the other and insulated from each other, said conductor being spaced from said side faces of the pole, to define a longitudinally extending duct therebetween and the splines being defined by alternate generally transversely extending recessed and raised portions along at least one transverse surface thereof disposed adjacent an adjacent turn, to form generally transverse vents between said adjacent turns communicating with said duct, and a passage adjacent the base of said pole for the entry of a coolant gas into said duct and vents.

6. Arrangement according to claim 5, wherein said recessed and raised portions are formed in both transverse surfaces of said conductor, the turns being so disposed that each recessed portion of one conductor is coincident with a recessed portion of an adjacent conductor.

7. Arrangement according to claim 5, wherein said recessed and raised portions are formed in one transverse surface only of said conductor, the turns being so disposed that the splined surface of one conductor is adjacent the plane transverse surface of an adjacent conductor.

8. Arrangement according to claim 5, wherein said recessed and raised portions are formed in one transverse surface only of said conductor, the turns of the winding being arranged in pairs, back to back, with the splined transverse surfaces of the adjacent conductors of each pair being disposed adjacent one another, and the plane transverse surfaces of each pair being disposed adjacent the plane transverse surface of an adjacent pair.

9. In a synchronous electric machine, including a rotor provided with a plurality of poles, each provided with generally longitudinally extending side faces, terminating at their radially outer edges in circumferentially projecting shoes; a rotor winding associated with each pole comprising a plurality of stacked turns of a rectangular cross-section, splined conductor, said conductor being spaced from said side faces of the pole to form a longitudinally extending duct, and being formed with splines defined by alternate transversely extending recessed and raised portions along its length in at least one transverse surface thereof which is disposed adjacent an adjacent turn, to form generally transversely extending vents between said adjacent turns communicating with said duct, at least one indent provided in at least one shoe of said pole for the passage of a coolant gas into said duct and out of said vents.

10. Arrangement according to claim 9, including a plurality of longitudinally spaced indents in said at least one shoe, said indents being inclined to increase the flow of coolant gas therethrough.

11. Arrangement according to claim 10, wherein said recessed and raised portions are formed in both transverse surfaces of said conductor, the turns being so disposed that each recessed portion of one conductor is coincident with a recessed portion of an adjacent conductor.

12. Arrangement according to claim 10, wherein said recessed and raised portions are formed in one transverse surface only of said conductor, the turns being so disposed that the splined surface of one conductor is adjacent the plane transverse surface of an adjacent conductor.

13. Arrangement according to claim 10, wherein said recessed and raised portions are formed in one transverse surface only of said conductor, the turns of the winding being arranged in pairs, back to back, with the splined transverse surfaces of the adjacent conductors of each pair being disposed adjacent one another, and the plane transverse surfaces of each pair being disposed adjacent the plane transverse surfaces of adjacent pairs.

14. In an electrical machine, a salient-pole rotor including a plurality of salient poles, a coil surrounding each pole, at least one generally axially extending air duct between each coil and its associated pole, means for supplying cooling air to said duct, a plurality of air vents formed between adjacent turns of each coil, said vents communicating with said duct and extending generally transversely through said turns and generally normal to the radial axis of its associated pole.

References Cited by the Examiner
UNITED STATES PATENTS 2,778,959  1/1957  Kilner _____ 310—64
2,913,606  11/1959  Guardiola _____ 310—180

MILTON O. HIRSHFIELD, *Primary Examiner.*

ORIS L. RADER, *Examiner.*

L. L. SMITH, *Assistant Examiner.*